April 15, 1924.

G. L. COFFMAN

DIRECTION SIGNAL

Filed June 23, 1922

INVENTOR
George L. Coffman.
BY
ATTORNEY

April 15, 1924.
G. L. COFFMAN
1,490,661
DIRECTION SIGNAL
Filed June 23, 1922    2 Sheets-Sheet 2
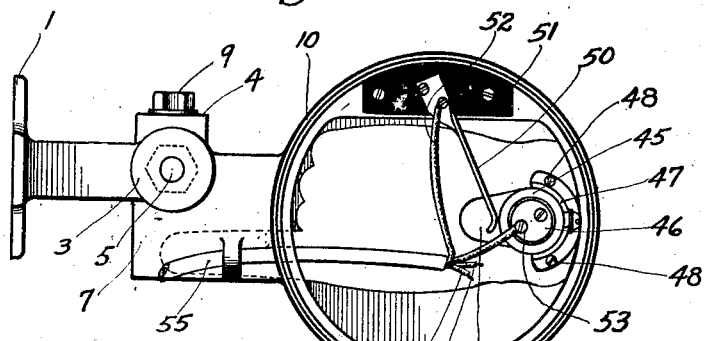
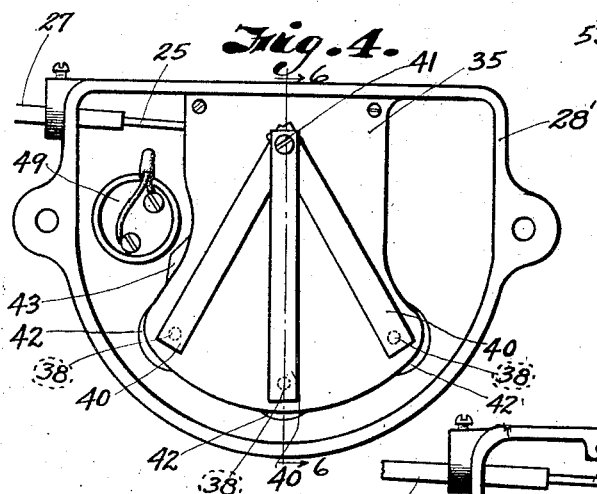
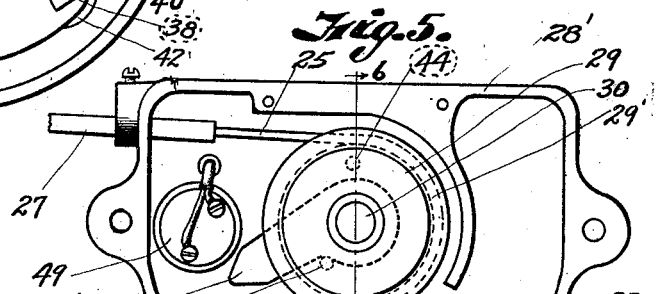
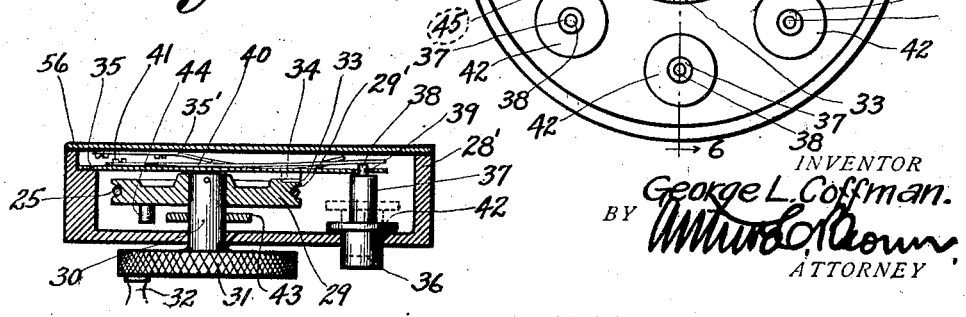
INVENTOR
George L. Coffman.
BY
ATTORNEY Patented Apr. 15, 1924.

1,490,661

UNITED STATES PATENT OFFICE.

GEORGE L. COFFMAN, OF KANSAS CITY, MISSOURI, ASSIGNOR OF TWO-THIRDS TO F. X. BUSCH AND O. L. GORGES, BOTH OF WICHITA, KANSAS.

DIRECTION SIGNAL.

Application filed June 23, 1922. Serial No. 570,377.

*To all whom it may concern:*

Be it known that I, GEORGE L. COFFMAN, a citizen of the United States, residing at Kansas City, in the county of Jackson and State of Missouri, have invented certain new and useful Improvements in Direction Signals; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a direction signal for vehicles, and more particularly to a signal adapted for attachment to the frame of an automobile, and comprising a semaphore arm whereby the direction in which the vehicle is about to turn or a warning that the vehicle is about to stop may be indicated by selective positioning of the arm.

It is the principal object of the invention to provide a signal having these characteristics which may be easily applied to the frame of any ordinary vehicle and may be easily and accurately controlled from a position adjacent the steering mechanism of the vehicle.

The invention also comprises means for illuminating the semaphore arm when the latter is in signaling position.

In accomplishing the above and other objects of the invention hereinafter mentioned, I have provided improved details of structure hereinafter described and illustrated in the accompanying drawings, wherein:

Fig. 3 is a vertical section on the line 3—3, Fig. 2, showing the signal in housed or non-functional position.

Fig. 4 is a vertical section of the control box on the line 4—4, Fig. 6.

Fig. 5 is a similar view on the line 5—5, Fig. 6.

Fig. 6 is a transverse section of the control box on the line 6—6, Figs. 4 and 5.

Figure 1:
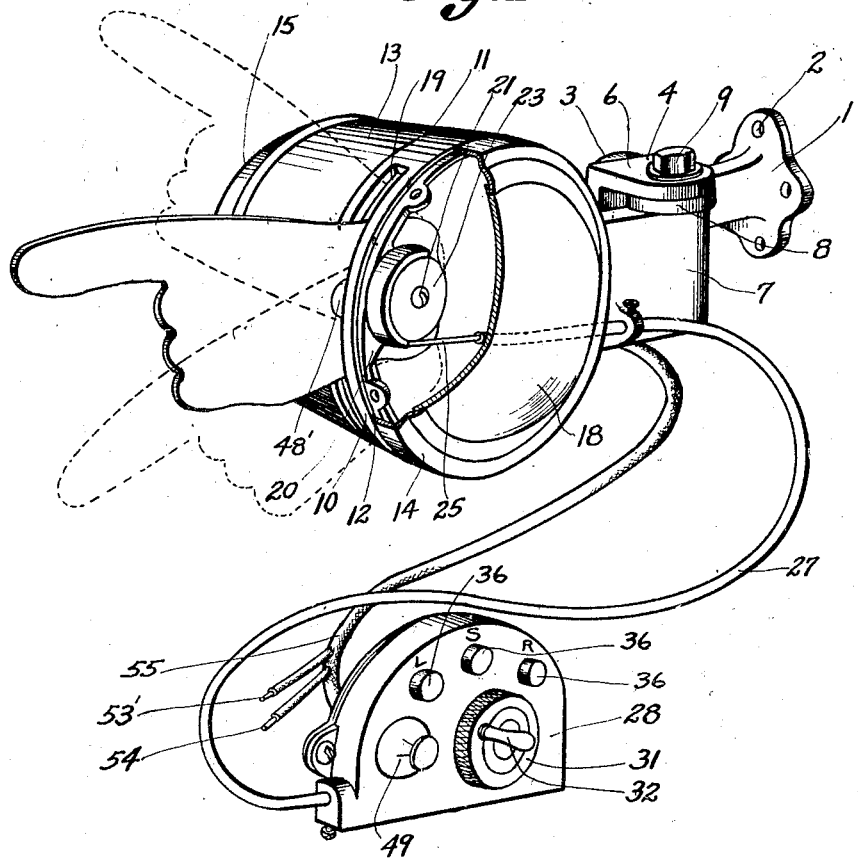
Fig. 1 is a perspective view of a direction signal embodying my improvements, a part of the signal housing being broken away to illustrate the interior mechanism.

Referring more in detail to the drawings: 1 designates a bracket whereby the signal housing may be mounted on the frame of a vehicle by screws or the like (not shown) projected through the apertures 2 in the base of the bracket. The bracket 1 has a head 3 to which is pivotally mounted an angle bar 4, preferably by means of a bolt 5, so that the angle bar may move on a horizontal axis to provide vertical adjustment of the signal housing. From the upper horizontal arm 6 of the angle bar is suspended an arm 7 forming a part of the signal housing and comprising a disk 8 that is pivotally attached to the angle bar arm by a bolt 9 so that the housing may have horizontal adjustment relative to the vehicle. The arm 7 is preferably integral with a ring 10 forming the frame of the signal housing and having annular shoulders 11 and 12, against which the housing body members 13 and 14 abut.

The housing body 13 is preferably formed of sheet metal and extends forwardly from the rim, the front end of the housing member carrying a lens 15 and containing a light bulb 16 and a reflector 17, to adapt the device for use as a spotlight. The rear housing member 14 carries a mirror 18 in which the driver of the vehicle may observe traffic to the rear.

The ring 10 has a slot 19 extending from its outer side through the bottom and to about the horizontal center, through which the semaphore arm may travel, as hereafter described.

Adjacent the outer side of the ring and at the rear of the slot is a boss 20, carrying a rotatable pin 21, to the forward end of which is fixed a bracket 22, to which the semaphore arm is rigidly attached.

Fixed to the rear end of the pin 21 is a drum 23 having a peripheral groove 24, within which is fixed a cable 25. Located within the rim of the drum and attached thereto is a spring 26 that is wound on the bearing 10' within which the pin 21 rotates, the inner end of the spring being fixed to the bearing so that by a pull on the cable the pin is rotated and the spring tensioned.

An arcuate extension 20' on the boss 20 surrounds the outer portion of the drum 23 and serves to guide the cable and confine it to the drum.

The cable 25 extends through a housing 27 to the control box 28, which is attached to the vehicle dash or other part of the vehicle adjacent the driver's position, and is run through an aperture in the housing to the interior thereof, where it is connected with a winding drum 29.

The drum 29 is fixed on a shaft 30 rotatable in the wall of the housing and provided at the exterior of the housing with a hand wheel 31 having a crank handle 32. The drum 29 has a peripheral groove 29' receiving the cable so that when the hand wheel is operated the cable is wound on the drum to retract the semaphore arm and tension the operating spring. The tendency of the spring is to extend the semaphore arm to signal position when the cable is released.

To hold the arm against this tendency I provide winding drum 29, with a socket 33 adapted for receiving an anchoring lug 34 on a spring plate 35 attached to the control housing 28' and extending along the face of the winding drum, the spring in the plate being sufficient to project the lug into the drum socket under normal conditions, so that after each operation the drum may be revolved with the lug wiping its socketed face until the socket reaches the lug position, when the lug is automatically projected into the socket to relock the signal arm. To insure return of the plate I preferably provide an auxiliary spring 35' which is attached to the signal housing cover 56 and bears yieldingly against the plate (Fig. 6).

Signals of this type are adapted for imparting information to pedestrians and occupants of other vehicles through selective positioning of the signal. One recognized code is that whereby positioning of the arm at an upward angle indicates a right-hand turn; positioning of the signal at a downward angle a left-hand turn; and positioning of the signal in a horizontal plane indicates that the signaling vehicle is about to stop.

To control this selective positioning of the signal I provide a series of keys on the control box, forming stops for limiting travel of the winding drum and the incidental release of the flexible cable. These keys are here shown to be three in number, and located in an arc of a circle, having the winding drum shaft 30 as a center.

Each of the keys comprises a cylindrical button 36 slidably mounted in an aperture in the rear housing plate, and a shank 37 of less diameter than the button. At the end of the shank is a tip 38 that extends through an aperture 39 in the spring plate 35, so that when the button is pressed inwardly it flexes the plate and removes the lug 34 from the socket in the winding drum to release the drum.

While the spring plate 35 yieldingly retains the keys in non-functional position, I prefer to provide an individual retaining spring 40 for each of the keys. Each of the springs 40 consists of a flat strip of spring metal secured to the spring plate 35 by a screw or the like 41, the springs 40 extending in fan shape to the several key positions. The ends of the keys are not connected with the springs 40, but merely abut against the faces thereof and normally tension the keys outwardly.

Forming a part of each of the keys is a collar 42 which normally bears against the inner face of the rear housing plate to hold the key in the housing against the tension of its individual spring 40.

Rotatably mounted on the winding drum shaft 30 is a stop arm 43, adapted for engagement by either of two pins 44 or 45 on the drum, according to whether the drum is moving to permit the signal to function under tension of the operating spring, or is being reversed to retract the signal and wind the spring under manual operation of the hand wheel.

This mode of operation of the winding drum and stop arm is provided to allow an extended movement of the signal arm relative to the movement of the stop arm, the signal arm being capable of movement through an arc of about 270 degrees from fully housed to fully extended position, while movement of the stop arm is limited to about 90 degrees, the pins 44 and 45 having a corresponding spacing on the winding drum.

The end of the stop arm is adapted for engagement with the selected key 36 between the collar 42 and the rear housing plate.

Normal position of the keys is that illustrated in Fig. 6, in which the collars 42 engage the rear housing plate so that they will not obstruct travel of the stop arm 43, the point of the arm traveling inside of the key shank 37 when the keys are in non-functional position, but engaging the key head of a set key to limit travel of the stop arm and the corresponding travel of the signal arm to set the signal at the selected position.

Figure 2:
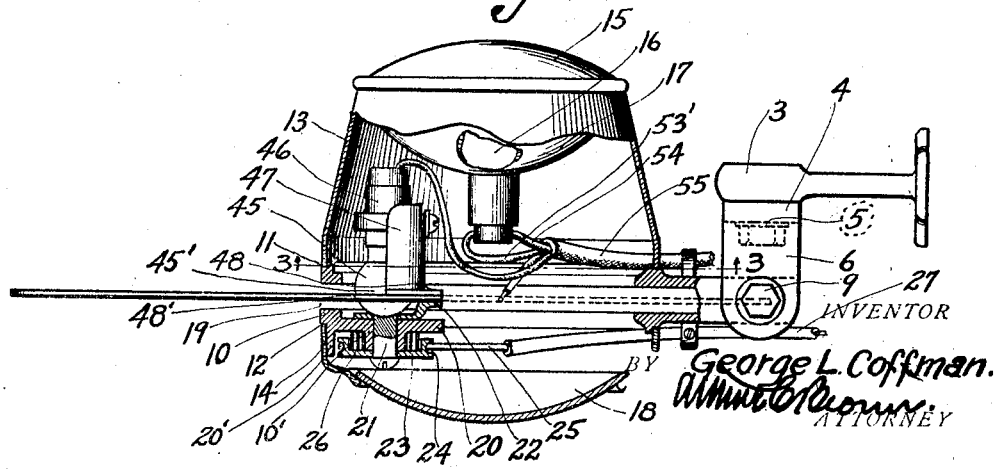
Fig. 2 is a plane view of the signal, a part of the housing being broken away and the winding mechanism being in section.

To adapt the signal for use at night I provide a lamp 45, Figs. 2 and 3, which is mounted on and adapted for rotation with the signal arm, and is adapted for illuminating both the front and rear faces of the arm. The preferred arrangement of the lamp is that illustrated in Fig. 2, wherein the lamp socket 46 is attached to a reflector 47, which is, in turn, permanently attached to the signal arm by screws or the like 48, the reflector being attached to the inner end of the arm so that it may direct the light rays outwardly along the face of the signal when the latter is set.

The lamp bulb 45' extends through a slot 48' in the signal arm so that one face of the signal is illuminated by the portion of the bulb at that side of the arm, and the other face by the projecting portion of the bulb.

The lamp circuit is controlled from a main switch 49 on the control box at the driver's position, and locally through a circuit making and breaking device comprising the reflector 47 and a brush 50, which is attached to a non-conductive plate 51 on the signal housing. One of the circuit wires 52 is connected with the brush and the other with a binding post 53 on the lamp socket, so that when the signal arm is revolved to an operative position, the brush will contact the reflector and close a circuit through the lamp, providing the main switch is closed.

The circuit wires 53' and 54 leading to the spotlight may run through the same housing 55 that carries the signal lamp, but are preferably controlled from an independent switch (not shown).

Assuming the parts to be constructed and assembled as described, the operation is as follows:

Under normal conditions the semaphore arm is concealed within the signal housing, with the operating spring under tension and the arm locked by engagement of the lug 33 in the socket in the cable winding drum 29. Should the driver of the vehicle upon which the signal is mounted desire to turn to the right, he presses the button marked R on the control box, flexing the spring plate 35 and removing the locking lug from its socket in the winding drum. Immediately upon release of the drum the spring operates to throw the semaphore arm about its axis, thereby winding the cable on the spring drum and unwinding it from the winding drum. This unwinding movement revolves the winding drum, carrying the pin 44 around, causing it to engage the stop arm and carrying the latter forward until the point of the stop arm abuts against the functioned key. The position of the semaphore arm for a right-turn signal is that wherein the arm extends at an upward angle, requiring a throw of the arm to its fullest extent. This necessitates travel of the stop arm past the first two keys which, remaining in non-functional position, do not obstruct the stop arm. After the turn has been made the semaphore arm is returned to the housing by rewinding the cable on the winding drum through the hand wheel 31, the operated key having returned to non-functional position as soon as pressure against it has been removed, so that during return movement of the drum the lug 33 travels in contact with the face of the drum and automatically returns to its locking position in the socket 34 when the drum has reached its initial position. Rewinding of the winding drum causes pin 45 to engage the stop arm 43 and return the arm to initial position so that it may engage a selected key upon a succeeding operation of the signal.

If the turn is to the left the first key, marked L, is operated and the semaphore arm stopped at the downward angle, the operation being the same as that for the right-hand turn, except that the travel of the parts is not so great.

The same is true of the stop signal, wherein the semaphore arm is extended horizontally.

For either of the operations there is an initial idle movement of the parts relative to the stop arm, and of the brush 50 relative to the reflector 47, the stop arm being picked up and the lighting circuit closed, however, before the semaphore arm reaches any of the functional positions, so that the signal may be illuminated and the signal arms stopped in proper position.

What I claim and desire to secure by Letters Patent is:

1. A signaling device comprising a movable indicator arm, normally restrained means urging the arm to a signaling position, and controlling mechanism comprising a plurality of individually operable devices selectively operable to release the urging means and limit movement thereof to stop the arm at the selected signalling position.

2. A signaling device comprising a movable indicator arm, normally restrained means urging the arm to a signaling position, controlling mechanism comprising a plurality of individually operable devices selectively operable to release the urging means and limit movement thereof, to stop the arm at the selected signalling position and means for returning and retensioning the indicator arm.

3. A direction signal comprising an indicator arm, a spring drum connected with the arm, controlling mechanism comprising a plurality of individually operable devices including means for actuating the drum to tension the arm to functional position, and stop members operable individually to release the drum and selectively limit movement of the stop arm.

4. A direction signal comprising a rotatable arm, a spring connected with said arm, a drum connected with said spring, a flexible cable attached to the drum, a winding drum connected with the cable, means for locking the winding drum, and selective keys for releasing the winding drum and limiting movement thereof to determine position of the indicator arm.

5. A direction signal comprising a rotatable indicator arm, a spring connected with said arm, a drum connected with said spring, a cable connected with said drum, a winding drum connected with said cable having a stop-engaging portion, a stop member normally urged to co-operative relation with said stop portion, and a plurality of keys adapted for independently actuating the stop member to release the drum, and means operable by the drum and engageable with a selected stop member to limit movement of the indicator arm.

6. A direction signal comprising an indicator arm, a normally tensioned spring urging the arm to functional position, spring controlling means comprising a cable, a winding drum for the cable, a stop member engaging the drum to restrain the spring, a plurality of keys, each operable to displace the stop member and release the drum pins on said drum, a stop arm engageable by said pins and movable to engagement with a functioned key, and means for reversing the winding drum to retension the operating spring.

7. A direction signal comprising a rotatable indicator arm, a drum attached to said arm, a spring connected with the drum, a cable attached to the drum, a winding drum connected with the cable, means for operating the winding drum to tension said spring, a stop for holding the winding drum, a plurality of keys individually operable on the stop to release the winding drum, a stop arm operable by the winding drum and engageable with a set key to limit travel of the winding drum.

8. In combination with a transversely slotted housing, an indicator arm rotatably mounted within the housing and projectable through the slot therein, a spring drum for actuating the arm, control mechanism comprising a plurality of individually operable keys, a winding drum, a flexible cable connecting the spring drum and winding drum, a flexible stop member normally restraining the winding drum and operable by any of said keys to release the drum, and means for rewinding the winding drum to retension the spring drum and return the signal arm to initial position.

In testimony whereof I affix my signature.

GEORGE L. COFFMAN.